June 11, 1963 A. C. LYNCH 3,093,819

MAGNETIC TRANSLATORS

Filed Nov. 17, 1958

Arnold C. Lynch

INVENTOR

BY Hall & Houghton

ATTORNEY

United States Patent Office 3,093,819

Patented June 11, 1963

3,093,819
MAGNETIC TRANSLATORS

Arnold Charles Lynch, Potters Bar, Middlesex, England, assignor to Her Majesty's Postmaster General, St. Martin's-le-Grand, London, England Filed Nov. 17, 1958, Ser. No. 774,467
Claims priority, application Great Britain Nov. 21, 1957
3 Claims. (Cl. 340—347)

The present invention relates to magnetic translators of the type in which magnetic cores are employed for registering information to be translated and for rendering the required translation thereof.

In the known magnetic translating devices employing magnetic gates the magnetic cores of the gates are required to serve as a memory and it is therefore desirable that the material of the cores should exhibit a substantially rectangular hysteresis loop. Furthermore, in such known devices it is a recognized problem to distinguish adequately between a gate which has received the number of stimuli required to effect operation of the gate and those gates which have received one less than the required number of stimuli.

It is an object of the invention to provide a magnetic translator of the type referred to in which the magnetic cores themselves are not required to exhibit any property of memory and therefore the material of the cores need not necessarily have a rectangular hysteresis loop, and also in which the magnetic condition of the gate or gates required to produce a given translation is clearly distinguishable from that of the remaining gates.

In its broadest aspect the invention comprises a plurality of switchable magnetic cores corresponding in number to the items of information for which translation may be required, a plurality of input leads connected to input windings on said cores, means for applying to selected of said input leads electrical impulses denoting an item requiring translation, the said input leads being arranged in groups and one lead only of each group being energized to denote any item requiring translation, the input windings of each core corresponding in number to the number of groups of input leads and the input windings of any one core being uniquely connected to one lead in each group whereby upon said energization of one lead in each group of input leads only one core has all its input windings energized, and means for magnetically saturating the cores, the strength of the magnetic fields produced by the respective input windings being such that when all the input windings of a core are energized simultaneously, the magnetization of the core is reversed and when one less than all the input windings are energized, the magnetic field of the core is not reversed.

More specifically, a translation device according to the invention for supplying translation of a plurality of codes each consisting of a group of digits, comprises a plurality of magnetic cores equal in number to the number of codes, a magnetizing circuit associated with each core for producing a magnetic field capable of saturating the core, a plurality of input windings associated with each core for producing magnetic fields opposite to the saturating field, the said input windings being connected to input circuits arranged in groups corresponding to the digits of a code so that only one circuit in each group is used in the representation of any one code, the connections of the input windings to the input circuits being arranged so that upon applying to the input circuits electrical impulses representing the digits of a code, one core only will have all its input windings energized, the strength of the fields produced by the input windings being such that if all the input windings of a core are energized the magnetization of the core is reversed whereas energization of all but one of the input windings of a core is not sufficient to effect reversal of magnetization; and a plurality of output windings associated with each core and corresponding in number to the number of digits required in the translation, the said output windings being connected from one core to another to output circuits so that upon reversal of the magnetization of any one core impulses are produced in the said output circuits to give the required translation.

The invention finds special application in the case of translators for small electronic telephone exchanges for translating one set of digits such as those dialled by a subscriber into another set of digits suitable for selecting a particular outgoing route from the exchange and will now be described in more detail with reference to the accompanying drawings illustrating purely diagrammatically alternative forms which such translation devices may take.

Figure 1:
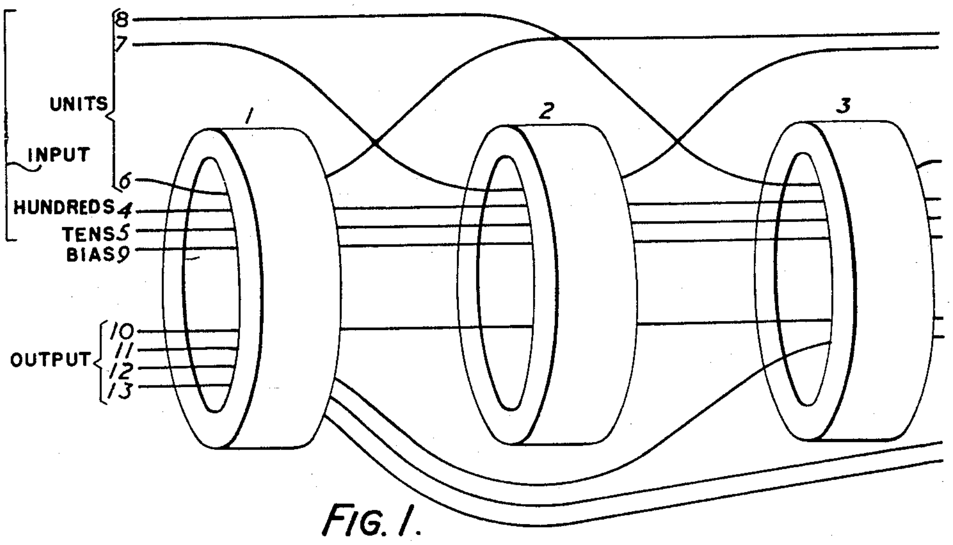
FIGURE 1 represents diagrammatically a portion of one form of translation device according to the invention.
Figure 2:
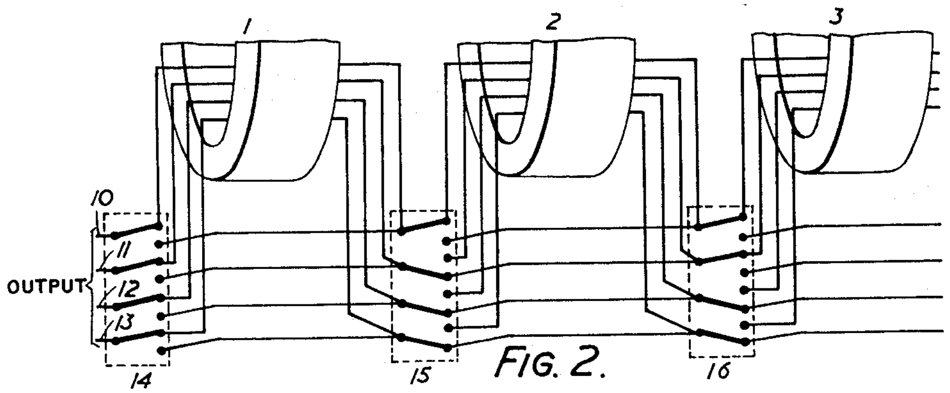
FIGURE 2 shows a modification of the device of FIGURE 1.
Figure 3:
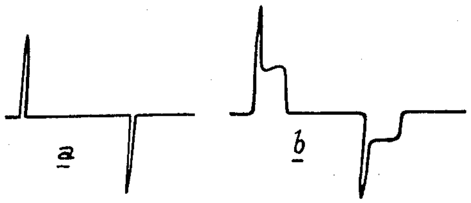

FIGURES 3*a* and 3*b* respectively show waveforms generated in the output circuits of the device of FIGURES 1 and 2.

Thus, in FIGURE 1 there are shown cores 1, 2 and 3 of the set of 1,000 cores intended to deal with any of 1,000 different incoming codes each code consisting of a set of three digits in the series 000 to 999. It is assumed that the incoming digits are available in "static" form i.e. as simultaneous currents in three input wires rather than successive currents in a single wire, and that they consist of three digits (hundreds, tens and units) in a decimal scale. In this example there are thirty input wires (divided into three groups of ten wires, one group for each of the hundreds, tens and units columns and the wires of each group designated 1 to 0) and each core is linked by three wires i.e. one wire from each of the hundreds, tens and units groups of input wires, with no two cores linked by the same combination of three wires. In FIGURE 1, there are shown for the purpose of illustration only one wire 4 of the hundreds group, one wire 5 of the tens groups and three wires 6, 7 and 8 of the units group, the three successive cores being linked by the same "hundreds" wire 4, and by the same "tens" wire 5, but by three different "units" wires 6, 7 and 8 so that core 1 represents the code 456, core 2 the code 457 and core 3 the code 458.

One further input wire 9 is provided and links all the cores. This will be referred to as the bias wire.

The operation of the input wires is as follows: The bias wire carries a steady current $i_b$ at all times. As hereinafter noted, this current $i_b$ is sufficient to saturate the cores in one direction. A set of digits requiring translation is represented by pulses of magnitude $i_p$ applied simultaneously to three of the other input wires (i.e. one of the "hundreds" wires, one of the "tens" wires, and one of the "units" wires). The direction of the magnetic field produced by the bias wire is opposite to that of the field produced by the pulses, and the magnitudes are such that the field from $3i_p$ is greater than the field from $i_b$ while the field from $i_b$ is greater than that from $2i_p$, each by a sufficient amount to saturate the core in the direction of the resultant field. All the cores are therefore magnetized to saturation initially by the bias current, but, when the pulses corresponding to a set of digits are applied to the corresponding input wires, the magnetization of only one core, i.e. the core in which the three input wires with which it is linked each have a pulse applied thereto, will be reversed while that of all the others remains substantially unaffected.

The number of output wires to be provided is equal to the number of digits which are required in the translation. These will be assumed to be binary digits and in the example considered the number of them would probably lie between 6 and 12, but for simplicity of illustration FIGURE 1 shows only four output wires 10, 11, 12 and 13 which are linked with the cores 1, 2 and 3, so as to produce translations 1111, 1000 and 1100 respectively, the digit 1 being indicated by a signal on a wire and 0 by the absence of such signal.

The operation of the output circuits is as follows: Upon the application of a pulse to select input wires corresponding to a set of digits requiring translation, the magnetization in only one core i.e. the core with which the three pulse-carrying input wires are linked, is reversed for the duration of the pulse, and there will be potentials induced, at the beginning and end of the pulse, in the output wires which link this core and the currents produced by these potentials, at either the beginning or the end of the pulse, serve as the signals indicating the required translation.

Thus in FIGURE 1, if a pulse is applied to each of the input wires 4, 5 and 7, cores 1 and 3 will be unaffected but the magnetization of core 2 will reverse; there will therefore be signals induced in the output wire 10, but not in the output wires 11, 12 or 13 which do not link core 2. This corresponds to the required translation 1000.

A practical difficulty with the arrangement shown in FIGURE 1 is that to change any translation it is necessary either to withdraw and rethread the wires from a large number of cores, or to cut and rejoin them at the core where the translation is required to be altered. The former process is time wasting and the latter, though acceptable if the number of changes remains small, may eventually result in a large number of untidy and possibly unreliable joints in the wires. It may therefore be preferred to provide beforehand for such changes of translation, by arranging terminal strips or tag-boards as shown at 14, 15 and 16 in FIGURE 2, which shows only the arrangement of the output wires for the three cores 1, 2 and 3. In this arrangement a full set of output wires is provided linking each core, and these wires are soldered to tags on a terminal strip; there is also a set of connections not linking the cores (which may consist either of wires or of sections of printed circuit on the terminal strip). The required translation is selected by soldering links between the tags of each tag-board, so that each of the output wires is completed at every core either by a wire linking the core or by a connection not linking the core. As will be seen in FIGURE 2, the link connections indicated at the respective tag-boards result in the same translations being given on output wires 10, 11, 12 and 13 as those in FIGURE 1.

A further possible method of allowing easy charges of translation is to use magnetic cores which are assembled from two half-rings, or are of some other shape which allows the core to be opened for the insertion or removal of wires.

Although the cores not selected by simultaneous pulses on a group of input wires remain nominally saturated, the flux density in some of them does in practice change appreciable, and signals are generated in the output wires and these signals have a waveform of the kind shown in FIGURE 3*a*, whereas the wanted signal is of the kind shown in FIGURE 3*b*. Discrimination against the unwanted signals can be achieved in several ways, notably by integrating the wanted signals or by examining them at a time slightly later than the beginning or the end of the actuating pulse on the input wires, but these precautions alone may not be sufficient. The unwanted signals come chiefly from the cores which receive one pulse less than the selected core and in the example considered in this description, there are 27 such cores and the total unwanted signal may therefore be large enough to be troublesome. Its amplitude can be reduced by adding to each output circuit a signal opposite in phase to the unwanted signals and of magnitude about half of the maximum possible unwanted signal. This additional signal can be obtained from a magnetic core having either a greater cross-section than that of the others, or more turns in its output winding, or both. A similar result can be obtained by reversing the connections of either the input or the output wires to alternate cores. This will, of course, reverse the wanted signal too if the latter comes from a core which windings have been reversed in this way, so that if this arrangement is adopted the circuit which receives the output signals must be arranged to be sensitive to signals in either sense.

The windings have been shown in the figures as single wires linking the cores, but it will be understood that they may consist of several turns. Single wires carrying currents of about 200 ma. are suitable for operating cores of about ¼ inch diameter.

Suitable materials for the magnetic cores are nickel-iron alloys such as "Mumetal" or "4–79 Permalloy," or ferrites, especially manganese-magnesium ferrite having a nearly-rectangular hysteresis loop.

I claim:

1. A magnetic translation device comprising a plurality of switchable magnetic cores, a bias wire threading all of said cores for magnetically saturating the cores in one and the same direction, a plurality of input wires arranged in groups of a predetermined number and threading selected cores and by-passing the remaining cores in such manner that each core is threaded by only one input wire of each group of input wires and every core is threaded by a different and unique combination of input wires, the said input wires threading the said selected cores in one and the same direction, means for applying a first electric potential to the bias wire to continuously magnetically saturate the cores in the said first-mentioned one direction, means for applying a second electric potential simultaneously to a combination of input wires formed by one input wire selected from each group of input wires for magnetizing the cores in the direction opposite to said first mentioned one direction and effective to cause reversal of magnetism in the one core through which all the said selected input wires are threaded but ineffective to cause reversal of magnetism in a core having threaded therethrough one less than the said combination of input wires, a plurality of output wires threaded through said cores, each wire threaded through selected cores and by-passing other cores, each core being threaded by at least one output wire, and output circuits connected to said output wires and responsive to impulses produced in one or more of said output wires by the reversal of magnetism in said one core for giving a required translation of the number represented by the said combination of input wires.

2. A translation device as claimed in claim 1 in which the cores are annular cores and the said means for magnetically saturating the cores, the said input windings, and the said output windings respectively which are threaded through the selected cores provide single turn windings.

3. A magnetic translation device comprising a plurality of switchable magnetic cores, a bias wire threading all of said cores to provide on each core a single turn winding for magnetically saturating the core in one direction, the magnetic saturation of all the cores being in the same direction, a plurality of input wires arranged in groups of a predetermined number and threading selected cores and by-passing the remaining cores in such manner that each core is threaded by only one input wire of each group of input wires and every core is threaded by a different and unique combination of input wires, the said input wires threading the said selected cores in one and the same direction to provide on each core single turn windings each of which is adapted to produce a magnetic flux opposed to that produced by the bias wire, means for applying a first electric potential to the bias wire to continuously magnetically saturate the cores in the said first-mentioned one direction, means for applying a second electric potential simultaneously to a combination of input wires formed by one input wire selected from each group of input wires for magnetizing the cores in the direction opposite to said first mentioned one direction and effective to cause reversal of magnetism in the one core through which all the said selected input wires are threaded but ineffective to cause reversal of magnetism in a core having threaded therethrough one less than the said combination of input wires, a plurality of output wires threaded through said cores, each wire threaded through selected cores and by-passing other cores, each core being threaded by at least one output wire, and a plurality of output circuits less in number than the number of cores and connected to said output wires by the reversal of magnetism in said one core for giving a required translation of the number represented by the said combination of input wires.

References Cited in the file of this patent

UNITED STATES PATENTS

| | | |
|---|---|---|
| 2,733,860 | Rajchman | Feb. 7, 1956 |
| 2,734,182 | Rajchman | Feb. 7, 1956 |
| 2,768,367 | Rajchman | Oct. 23, 1956 |
| 2,782,399 | Rajchman | Feb. 19, 1957 |
| 2,843,838 | Abbott | July 15, 1958 |
| 2,846,671 | Yetter | Aug. 5, 1958 |
| 2,882,524 | Spencer | Apr. 14, 1959 |
| 2,884,622 | Rajchman | Apr. 28, 1959 |
| 2,912,679 | Bonorden | Nov. 10, 1959 |
| 2,922,996 | Young | Jan. 26, 1960 |
| 2,953,778 | Anderson et al. | Sept. 20, 1960 |